United States Patent [19]
Allan et al.

[11] 3,925,666
[45] Dec. 9, 1975

[54] GAS DETECTION SYSTEM

[75] Inventors: Colin J. Allan; John G. Bayly, both of Deep River, Calif.

[73] Assignee: Atomic Energy of Canada Limited, Ottawa, Canada

[22] Filed: July 29, 1974

[21] Appl. No.: 492,458

[30] Foreign Application Priority Data
Nov. 14, 1973  Canada................................. 185825

[52] U.S. Cl. ................ 250/338; 250/221; 250/393; 340/237 R; 340/242; 356/51
[51] Int. Cl.² ......................... G01D 21/04; G01J 1/00; G01N 21/34; G08B 21/00
[58] Field of Search ........... 250/338, 393, 343, 221, 250/226; 356/51, 201, 75; 350/285; 340/258 B, 237 R, 242

[56] References Cited
UNITED STATES PATENTS

| | | | |
|---|---|---|---|
| 2,594,122 | 4/1952 | Cashman | 250/226 |
| 2,769,374 | 11/1956 | Sick | 250/221 X |
| 2,930,893 | 3/1960 | Carpenter et al. | 356/51 |
| 3,820,897 | 6/1974 | Roess | 356/75 |

FOREIGN PATENTS OR APPLICATIONS

| | | | |
|---|---|---|---|
| 1,017,178 | 1/1966 | United Kingdom | 250/338 |

OTHER PUBLICATIONS

Faust et al., "Gas Maser Spectroscopy in The Infrared," Applied Physics Letters, v 1, n 4, Dec. 1, 1962, pp. 85–88.

*Primary Examiner*—James W. Lawrence
*Assistant Examiner*—T. N. Grigsby
*Attorney, Agent, or Firm*—Edward Rymek

[57] ABSTRACT

The gas detection system provides for the effective detection of gas leaks over a large area. It includes a laser which has a laser line corresponding to an absorption line of the gas to be detected. In the instant case, a He-Xe laser scans a number of retroreflectors which are strategically located around a $D_2O$ plant to detect $H_2S$ leaks. The reflected beam is focussed by a telescope, filtered, and passed into an infra-red detector. The laser may be made to emit two frequencies, one of which corresponds with an $H_2S$ absorption line; or it may be modulated on and off the $H_2S$ absorption line. The relative amplitude of the absorbed light will be a measure of the $H_2S$ present.

6 Claims, 4 Drawing Figures

GAS DETECTION SYSTEM

This invention relates to a leak detection system for an array of tanks containing potentially dangerous gases, and to a novel infra-red absorption detector using a He-Xe laser.

In the production of heavy water, $D_2O$, it is required that large quantities of $H_2S$ be used within the plant. The $H_2S$ is usually contained in large tanks set out in parallel rows which are interconnected by pipes. Since $H_2S$ is a potential health hazard, these tanks and pipes are constructed with great care, but the possibility of a leak is ever present. It has also been determined, that if $H_2S$ is continuously present in moderated quantities, a person may temporarily lose his ability to detect its distinctive scent, and thus ignore its presence. In addition, if a large quantity of $H_2S$ is present in an area, as by a major leak, a person entering the area may be totally unaware of its presence as the $H_2S$ will immediately paralyze his olfactory nerve.

It is, therefore, essential to have a reliable system which will continuously monitor the area around a plant for the presence of $H_2S$. It is also preferable to have a system which will measure the concentration of $H_2S$ in the atmosphere, as well as indicate the approximate location of the $H_2S$ leak.

Infra-red absorption techniques have in the past found may applications in the detection and analysis of various elements and compounds. However, these applications have been found to be complex and expensive, as well as continuously in need of adjustment when required to monitor an area such as a $D_2O$ production plant.

It is, therefore, an object of this invention to provide a gas leak detection system which will monitor the presence of the gas caused by a leak within a plant.

A further object of this invention is to provide a system which will indicate the gas concentration in the area.

Yet another object of this invention is to provide a system which will indicate, to a degree, the location of the gas leak in the plant area.

A further object of this invention is to provide a novel $H_2S$ detector.

These, and other objects, are achieved for the detection of $H_2S$ leaks by providing a pair of identical detectors. Each detector includes a He-Xe laser which emits at $3.6859\mu m$ and which is mounted on a scanning device with a telescope. The beam is made to scan a number of retroreflectors strategically located along the top of the outer $H_2S$ tanks, as well as down the edges of the corner tanks. The beam is reflected from the retroreflectors, forming a curtain of optically sensitive paths along two sides of the plant. By placing the two detectors at diagonally opposite corners of the storage area, this curtain is extended to surround the entire plant. If a leak occurs, a plume of $H_2S$ will cut through the curtain of optically sensitive paths and the scanning beam will be absorbed by the $H_2S$ which has a major absorption line at $3.6858\mu m$. The intensity of the reflected beam detected will vary depending on the concentration and diameter of the $H_2S$ plume.

Further, a second pair of detectors may be located at two other diagonally opposite corners to provide a second curtain of optically sensitive paths. This second curtain forms a grid with the first curtain, thus enabling the operator to determine where the gas is moving through the grid. Because the detector depends on the absorption by the $H_2S$ of one specific wavelength, (whereas other contaminants, i.e. dust, fog, etc., absorb at all wavelengths), it may be useful to compare the energy transmitted at the $H_2S$ absorption wavelength with that transmitted at a nearby wavelength. To do this, the Zeeman effect may be used in which the laser line is shifted on and off of resonance, providing a beam of constant intensity, but at two different frequencies. The difference in reflected beam intensity provides a measure of the concentration of $H_2S$ detected.

These, and further features of the invention, will be described in more detail in conjunction with the accompanying drawings in which.

Figure 1:
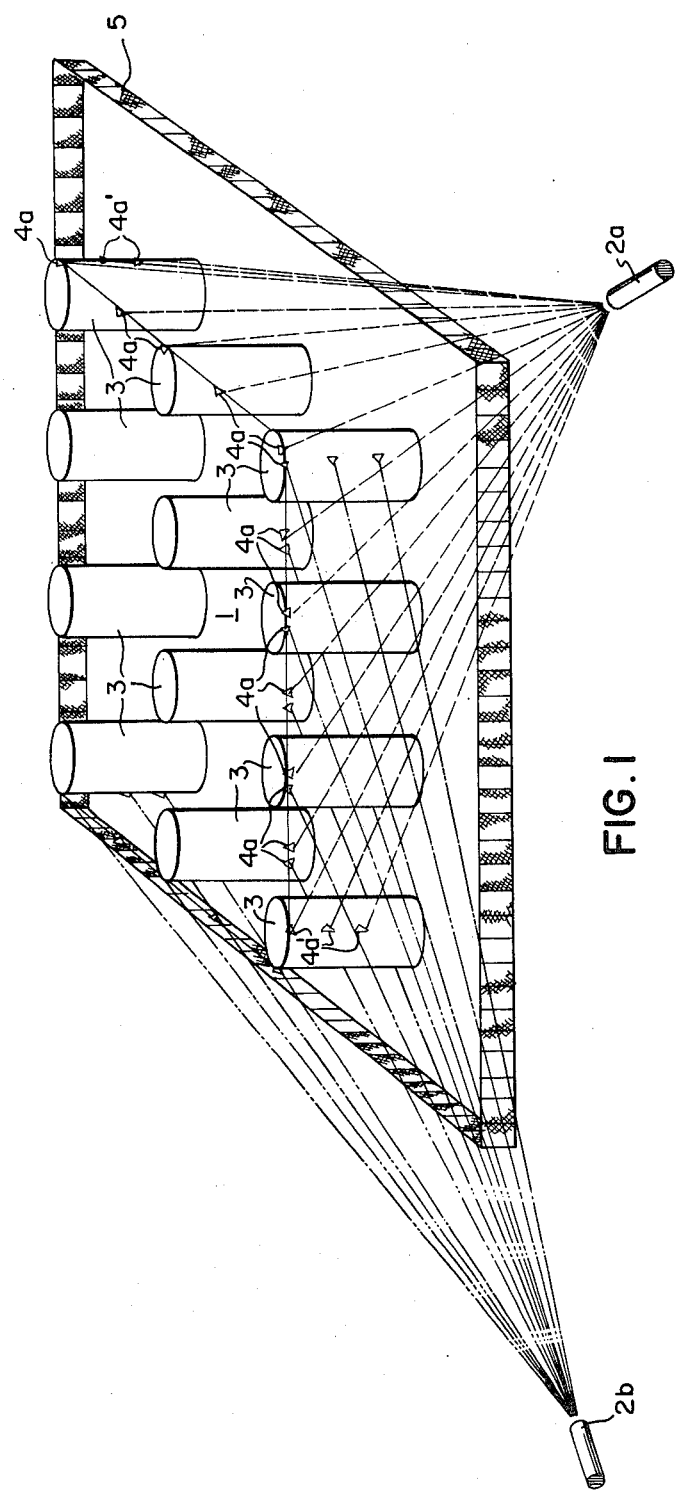
FIG. 1 is a simplified perspective view of a heavy water plant.
Figure 3:
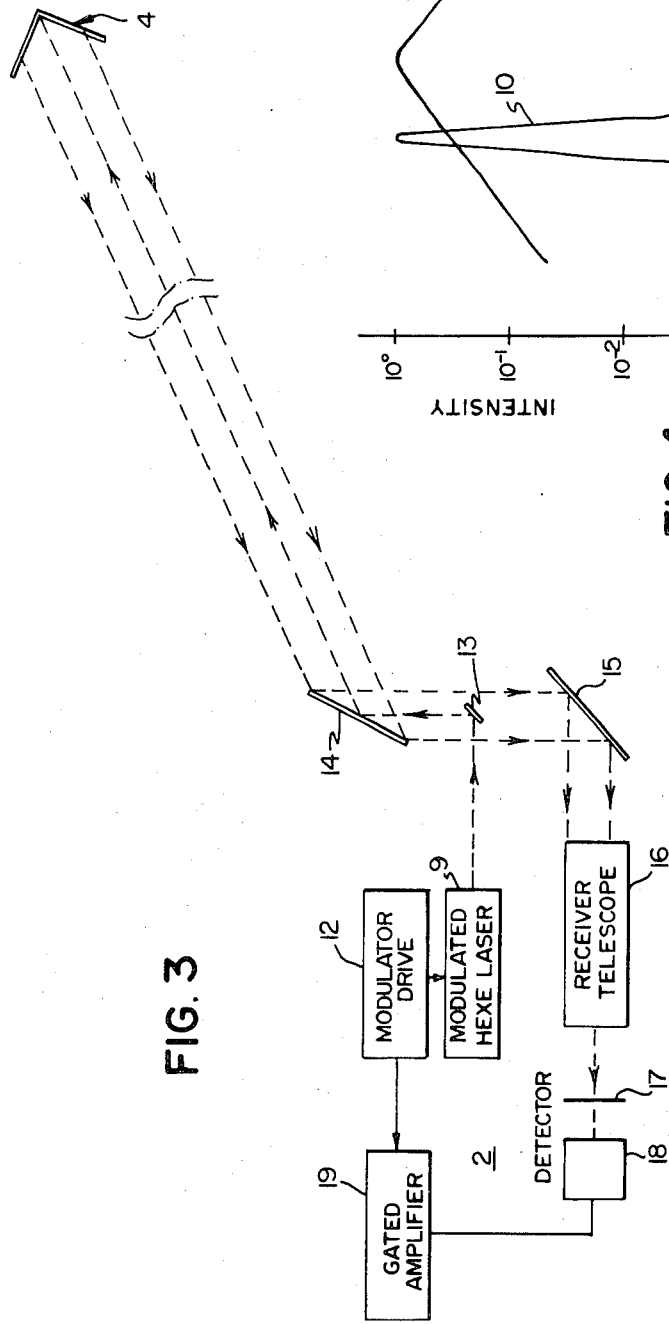
FIG. 3 is a schematic view of the laser detector.

A simplified view of a $D_2O$ plant 1 is shown in FIG. 1. It includes tanks 3 interconnected by pipes and other peripheral equipment (not shown). Usually, the tanks are arranged in parallel rows forming a rectangular area, however, the detection system will apply equally well to an area of any shape. In a heavy water production plant, the tanks are usually approximately 100 meters high and spaced at 50 meter intervals. The immediate area around the plant is usually fenced 5 to provide an exclusion area where stringent safety regulations are enforced. Four infra-red absorption detectors 2, are located outside the exclusion area. The detectors may be of the type to be described in conjunction with FIG. 3, or, may be any conventional type. Preferably, one detector 2 is placed near each corner such that it has a direct line of sight toward two sides of the plant 1. For simplicity, only detectors 2a and 2b are shown with their corresponding beam lines. Reflectors 4a for detector 2a, are mounted along a line at the top of the outer tanks 3 on two sides of the plant. Additional reflectors 4a may be mounted down the side of the corner tanks and at any other strategic location in the plant which is in direct line of sight with detector 2a. Similar reflectors are mounted for detector 2b, and the two other detectors which are not shown. The number of reflectors per detector will vary depending on the spacing of the tanks or the size of the plant. They may be spaced at approximately 25 meter intervals, but may be closer if greater precision is desired. For convenience, corner or retroreflectors are used. since they assure the reflection of a beam parallel to the incident beam path without the necessity of precise or continuous adjustment. Each detector 2, which will be described in more detail in conjunction with FIG. 3, is adapted to periodically scan all of its corresponding reflectors, thus forming a curtain of optically sensitive paths along two sides of the plant. Two diagonally opposite detectors will therefore scan all four sides of the plant. Any gas escaping from the area will absorb some of the light in one or more of these paths. Therefore, the variation of the reflected beam intensity as detected by detector 2 will be an indication of the existence of a gas leak.

Figure 2:
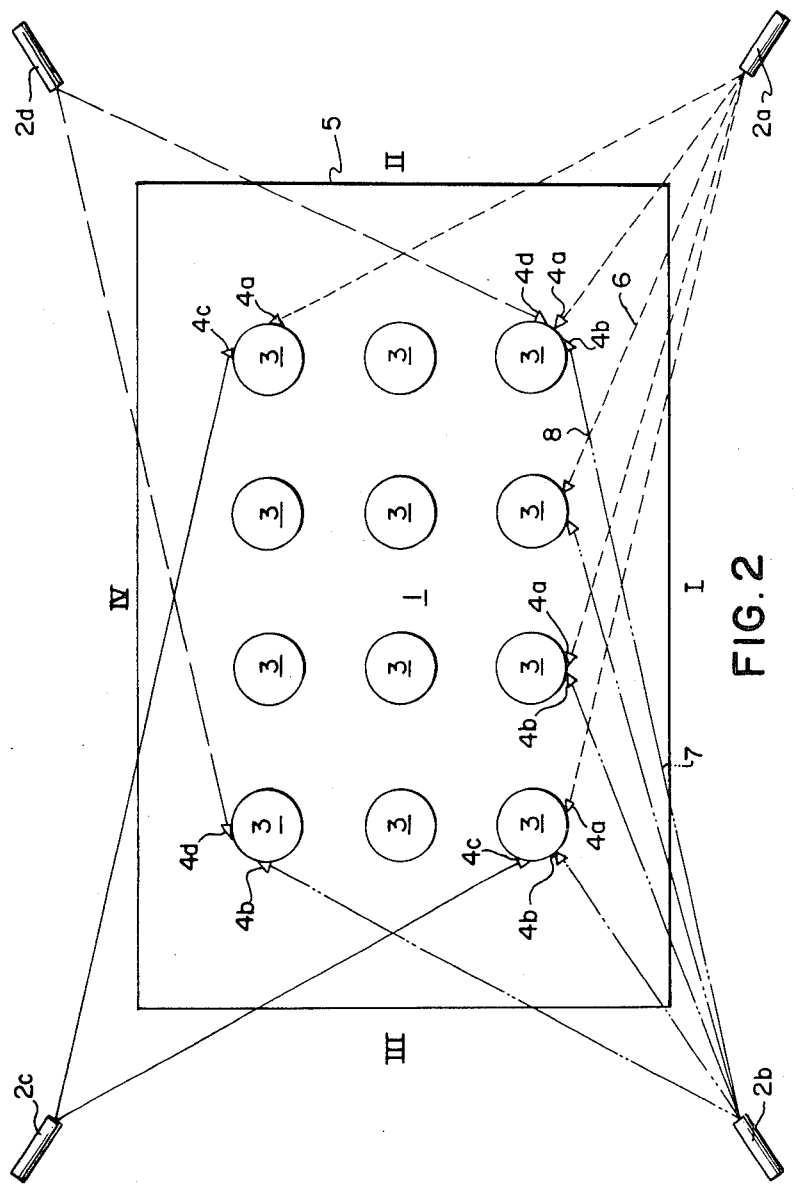
FIG. 2 is a plan view of a plant having four detectors.

In FIG. 2, the elements which correspond with those in FIG. 1 are referred to using like reference numbers. An example plant 1 is shown having 12 tanks 3 in three parallel rows. To provide a system which will detect gas plumes on all four sides of the plant, two detectors, 2a and 2c, are required with appropriate reflectors 4a and 4c. Only a small number of reflectors are shown to simplify the drawing. Detector 2a will scan sides I and II, whereas the detector 2c will scan sides III and IV.

A second group of detectors, 2b and 2d, are shown with their corresponding reflectors 4b and 4d. These two detectors also scan all four sides of the plant. If detectors 2b and 2d are mounted outside the exclusion area at some distance from 2a and 2c, as shown in FIG. 2, their beam paths will form a grid with the beam paths from detectors 2a and 2c. This grid assists the operator in locating the area in which a leak has occurred. For example, if detector 2a indicates a decrease in reflected beam intensity along path 6, and detector 2b also indicates a decrease in reflected beam intensity along path 7, the operator will know that a plume of gas is moving through intersection 8. If a single detector 2a is used for sides I and II, the operator would only know that the plume is intersecting the beam somewhere along path 6.

Figure 4:
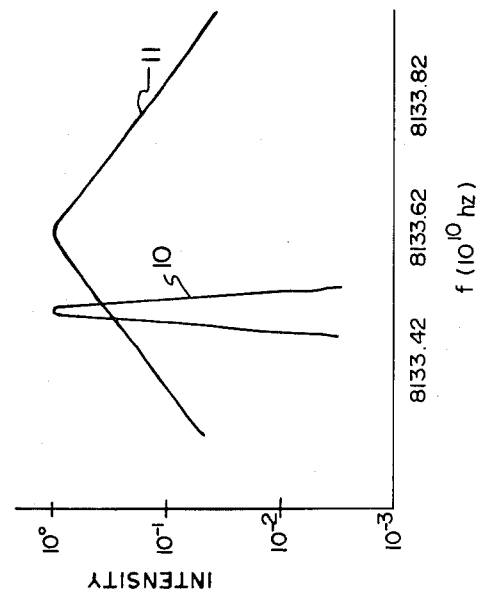
FIG. 4 is a graph showing the coincidence of the He-Xe laser line and the $H_2S$ absorption line.

A schematic diagram of the infra-red absorption detector 2 is shown in FIG. 3. The arrangement may include a conventional modulated infra-red source with an appropriate optics system to provide a collimated light beam with a wavelength corresponding to the absorption wavelength of the gas being monitored. In the preferred embodiment, however, a modulated He-Xe laser light source 9 is used, as it provides a laser line which is in close coincidence with an $H_2S$ absorption line. FIG. 4 illustrates the laser line 10 and the $H_2S$ absorption line 11.

The peak position of these lines are described by H. C. Allen Jr. et al., Journal Chemical Physics 24, 35, 1956, and W. L. Faust et al., Appl. Phys. Letts. 1, 85, 1962. The laser gain profile is Doppler broadened and has a full width a half maximum of $1.7 \times 10^8$ Hz, assuming an atomic temperature in the laser discharge tube of 500°K as described by C. K. N. Patel in "Lasers Vol. 2" ed. A. K. Levine (Marcel Dekker, Inc., New York), 135, 1968, while the $H_2S$ absorption line is pressure broadened and will be approximately Lorentzian in shape with a full width at half maximum of about $15 \times 10^8$ Hz.

Applying a magnetic field to the laser separates the gain profile into two components by the Zeeman effect, one of which is shifted towards the centre of the $H_2S$ line, and the other of which is shifted in the opposite direction. The laser then emits at two frequencies, the two having opposite circular polarizations. The magnetic field is adjusted so that the higher frequency component exactly matches the $H_2S$ line centre. Then if $H_2S$ is present in the atmosphere, this component will be strongly absorbed compared to the second component. By alternately passing the two lines a given modulation frequency, the output of the detector will be modulated, the amplitude of which will be a measure of the $H_2S$ present in the light path. This can be effected by using an etalon (or etalons) which can be tuned to the two frequencies, or by converting the circularly polarized radiation to plane polarized radiation using a bi-refrigent quarter-waveplate, and then passing the radiation through a rotating plane polarisor.

Alternately, the transmission of the 3.6859$\mu$m He-Xe laser line, may be compared with that of another He-Xe laser line, such as the line at 3.9966$\mu$m. Still another method would be to modulate the strength of the tuning magnetic field so as to modulate the laser line (one component) on and off resonance with the $H_2S$ line.

The various laser beam modulating systems described above are all located at the output of the laser. However, with exception of the magnetic field of the Zeeman shifting, they could also be located in other parts of the optics to be described below, such as, at the input of the detector.

Continuing with FIG. 3, the laser 9 is controlled by a modulator drive 12 providing a laser beam which is reflected from a plane mirror 13 onto a second mirror 14. Mirror 14 is controlled so as to successively direct the beam to each retroreflector 4 for a period of time. The length of time the beam is directed to each reflector may be varied. At mirror 13 and mirror 14, the beam diameter is about 1 or 2 mm. Mirror 13 will, therefore, have a diameter of 1 to 2 mm. Because of the beam divergence, 1 or 2 mr, the beam diameter at the retroreflector, if located approximately 100 m from mirror 14, is about 10–20 cm, and the beam reflected from retroreflector 4 has a diameter of 20–40 cm at mirror 14. Mirror 14 can have corresponding dimensions, though some beam loss would be acceptable. The reflected beam is directed by mirror 14 back towards mirror 13, but because of the large beam diameter, relative to the dimensions of mirror 13, most of the beam reaches a mirror 15 where it is directed into a telescope 16, which may be of the Cassegrainian or Newtonian type. The focussed beam is then passed through a narrow band pass filter 17 and into a standard infra-red detector 18. The band pass filter eliminates ambient radiation of wavelengths different from that of the laser 9, and thereby reduces the system noise. The infra-red detector may be a PbSe detector, an InAs detector, a pyro-electric detector, or any other suitable detector. The output of the infra-red detector 18, after preamplification, is fed into a gated amplifier 19, which derives its gate signal from the modulator drive 12 and provides an output reading. The laser, receiving telescope and electronics could be mounted indoors while the mirrors would be mounted outdoors.

The use of the He-Xe laser absorption detector operating at 3.6859$\mu$m for $H_2S$ detection, is not confined to heavy water plants, but may be used for detecting $H_2S$ in the atmosphere around any plant or installation such as a sour gas well. It may also be used to detect the presence of $H_2S$ in any sample gas contained in a gas absorption cell, such as a White Cell, by directing the laser beam through the cell.

In operation, mirrors 14 in detectors 2a and 2c, would normally be controlled as one subsystem so that the scanning of all sides of the plant would be completed simultaneously. Mirrors 14 in detectors 2b and 2d would be tied together in the same manner. This allows the sub-systems to scan at different rates, one subsystem could direct the beam at each reflector for approximately 0.10 seconds providing a fast scan, whereas the other subsystem could direct the beam at each reflector for a period of approximately 10 seconds providing greater sensitivity for the monitoring of minute concentrations of gas.

In addition, mirror 14 control could further be programmed to allow the operator complete flexibility as to the scan rate, and also as to which reflectors he wishes to scan.

What is claimed is:

1. An apparatus for monitoring a known gas in the atmosphere around a plant area comprising:

a. a first number of reflector means mounted in a spaced manner in the plant area;
b. first detector means positioned at a first predetermined location in direct line of sight with each first reflector means, the first detector means including:
  i. light source means providing a collimated beam having at least a wavelength which corresponds to an absorption line of the gas;
  ii. means for cyclically directing the bean onto each first reflector means at a first scan rate; and
  iii. means for receiving the reflected beam indicating the presence of the gas in the beam path as a function of any absorption of the corresponding wavelength;
c. a second number of reflector means mounted in a spaced manner in the plant area; and
d. second detector means positioned at a second predetermined location in direct line of sight with each second reflector means such that the lines of sight between the second detector means and the second reflector means overlap with the lines of sight between the first detector means and the first reflectors means to form a grid, the second detector means including:
  i. light source means providing a collimated beam having at least a wavelength which corresponds to an absorption line of the gas;
  ii. means for cyclically directing the beam onto each second reflector means at a second scan rate; and
  iii. means for receiving the reflected beam indicating the presence of the gas in the beam path as a function of any absorption of the corresponding wavelength.

2. An apparatus as claimed in claim 1 wherein said second scan rate is greater than said first scan rate such that the first detector is sensitive to a small quantity of said gas and the second detector provides a fast response to a large quantity of said gas.

3. An apparatus as claimed in claim 1 wherein said gas to be monitored is $H_2S$ and the light source means includes a He-Xe laser.

4. An apparatus for monitoring a known gas in the atmosphere around a plant area comprising:
a. first number of reflector means mounted in a spaced manner along a first section of the perimeter of the plant area;
b. a second number of reflector means mounted in a spaced manner along the remaining second section of the perimeter of the plant area;
c. a third number of reflector means mounted in a spaced manner along the perimeter of the plant area such that the third reflector means overlap a portion of said first and second section;
d. a fourth number of reflector means mounted in a spaced manner along the perimeter of the plant area such that the fourth reflector means overlap the remaining portion of said first and second sections; and
e. first, second, third and fourth detector means positioned at spaced locations outside the plant area in direct line of sight of said first, second, third and fourth reflector means respectively, each of said detector means including:
  i. light source means providing a collimated beam having at least a wavelength which corresponds to an absorption line of the gas;
  ii. means for cyclically directing the beam onto each corresponding reflector means at a predetermined scan rate; and
  iii. means for receiving the reflected beam indicating the presence of the gas in the beam path as a function of any absorption of the corresponding wavelength.

5. An apparatus as claimed in claim 4 which further includes:
control means for maintaining the scan rate of said third and fourth detector means greater than the scan rate of said first and second detector means.

6. As apparatus as claimed in claim 4 wherein said gas is $H_2S$ and the light source includes a He-Xe laser.

* * * * *